United States Patent
Pan

(10) Patent No.: US 10,481,449 B2
(45) Date of Patent: Nov. 19, 2019

(54) ARRAY SUBSTRATE WITH COLOR FILTER LAYER AND METHOD OF PRODUCING THE SAME AND LIQUID CRYSTAL DISPLAY

(71) Applicant: Shenzhen China Star Optoelectronics Technology Co., Ltd., Shenzhen, Guangdong (CN)

(72) Inventor: Yuxin Pan, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 124 days.

(21) Appl. No.: 15/542,423

(22) PCT Filed: Jun. 22, 2017

(86) PCT No.: PCT/CN2017/089595
§ 371 (c)(1),
(2) Date: Jul. 8, 2017

(87) PCT Pub. No.: WO2018/223428
PCT Pub. Date: Dec. 13, 2018

(65) Prior Publication Data
US 2018/0373103 A1    Dec. 27, 2018

(30) Foreign Application Priority Data
Jun. 8, 2017 (CN) .......................... 2017 1 0428310

(51) Int. Cl.
*G02F 1/1362* (2006.01)
*G02F 1/1368* (2006.01)

(52) U.S. Cl.
CPC ...... *G02F 1/136209* (2013.01); *G02F 1/1368* (2013.01); *G02F 2001/136222* (2013.01)

(58) Field of Classification Search
CPC ... G02F 1/136209; G02F 2001/136222; G02F 1/1368; G02F 1/133516
(Continued)

(56) References Cited

U.S. PATENT DOCUMENTS

2002/0017645 A1    2/2002   Yamazaki
2011/0001909 A1*   1/2011   Tseng ................ G02F 1/136209
                                                                349/106
(Continued)

FOREIGN PATENT DOCUMENTS

CN      103676294 A    3/2014
CN      104166280 A    11/2014
(Continued)

*Primary Examiner* — Nathanael R Briggs
*Assistant Examiner* — William D Peterson
(74) *Attorney, Agent, or Firm* — Andrew C. Cheng

(57) ABSTRACT

An array substrate including a color filter layer is provided. The array substrate includes a first substrate, a TFT array, arranged on the first substrate, and a color filter layer arranged on the TFT array. The color filter layer includes color-resist units with different colors. A mixed color-resist area is arranged between the two neighboring color-resist units. The mixed color-resist area comprises two or more color-resist film layers arranged in layers with different colors. A method of producing an array substrate having a color filter layer is also provided. A liquid crystal display includes the array substrate having the color film layer is also proposed.

15 Claims, 1 Drawing Sheet

(58) Field of Classification Search
USPC .......................................................... 349/42
See application file for complete search history.

(56) References Cited

U.S. PATENT DOCUMENTS

2016/0246111 A1* 8/2016 Chen ........................ H04N 9/12
2016/0370648 A1* 12/2016 Yao ....................... G02F 1/1335

FOREIGN PATENT DOCUMENTS

| CN | 104808381 A | 7/2015 |
| CN | 104991371 A | 10/2015 |
| CN | 106249494 A | 12/2016 |
| TW | 525013 B | 3/2003 |

* cited by examiner

ARRAY SUBSTRATE WITH COLOR FILTER LAYER AND METHOD OF PRODUCING THE SAME AND LIQUID CRYSTAL DISPLAY

BACKGROUND

1. Field of the Disclosure

The present disclosure relates to the field of liquid crystal display, and more particularly, to an array substrate with a color filter layer, a method of producing the array substrate, and further a liquid crystal display (LCD) with the array substrate.

2. Description of the Related Art

A liquid crystal display (LCD) is a display with an extremely flat screen. The LCD includes a thin film transistor (TFT) array substrate, a color filter substrate, and a liquid crystal layer. The TFT array substrate and the color filter substrate are arranged opposite. The liquid crystal layer is arranged between the TFT array substrate and the color filter substrate. A pixel array, a data line, and a scanning line are arranged in the TFT array substrate. The data line crosses the scanning line. A data signal is provided to the pixel array through the data line. A scanning signal is provided to the pixel array through the scanning line.

With the development of technology, the LCD becomes more widely applied. A layer of color film is disposed on the array substrate in a conventional LCD, without aligning the array substrate with the color filter substrate, to implement better color display on the LCD and to realize red, blue, and green (RBG) primary colors on the array substrate. The above-mentioned technique is called color filter on array (COA) technique. In addition, the growing trend in the conventional LCD, such as a cellphone terminal, a desk display, and a notebook computer, is to have a viewing angle. Besides the demand for a viewing angle, the color shift because of a viewing angle needs to be modified as well.

There are many causes of a color shift because of a viewing angle. Among these causes, a light leak from neighboring pixels due to a viewing angle is a main issue. Therefore, it is urgent to solve the problem of the color shift because of a viewing angle for an array substrate adopting the COA technique.

SUMMARY

In light of the problem of related art, an object of the present disclosure is to propose an array substrate with a color filter layer. The adoption of the array substrate can amend a color shift because of a viewing angle caused by a light leak from neighboring pixels effectively so as to improve the display quality of an LCD.

According to one embodiment of the present disclosure, an array substrate including a color filter layer is provided. The array substrate includes a first substrate, a thin film transistor (TFT) array, arranged on the first substrate, and a color filter layer arranged on the TFT array. The color filter layer includes color-resist units with different colors. A mixed color-resist area is arranged between the two neighboring color-resist units. The mixed color-resist area comprises two or more color-resist film layers arranged in layers with different colors.

In one aspect of the present disclosure, an upper surface of the mixed color-resist area is flush with an upper surface of one of the neighboring color-resist units.

In another aspect of the present disclosure, the color filter layer includes a red color-resist unit, a green color-resist unit, and a blue color-resist unit. The two or more color-resist film layers are red, green, or blue.

In another aspect of the present disclosure, thickness of the color-resist film layers with the different colors is the same in the mixed color-resist area.

In still another aspect of the present disclosure, the mixed color-resist area comprises a first color-resist film layer and a second color-resist film layer. The first color-resist film layer and the second color-resist film layer are arranged in layers with different colors. The first color-resist film layer and the second color-resist film layer have the same color with one of the two correspondingly neighboring color-resist units.

In yet another aspect of the present disclosure, the first color-resist film layer and one of the two correspondingly neighboring color-resist units are formed integrally. The second color-resist film layer and the other correspondingly neighboring color-resist unit are formed integrally.

According to another embodiment of the present disclosure, a method of producing an array substrate including a color filter layer is provided. The method includes forming a thin film transistor (TFT) array and a color filter layer arranged on a first substrate successively. Forming the color filter layer comprises: producing and forming color-resist units with different colors on the TFT array successively, and arranging a mixed color-resist area between the two neighboring color-resist units wherein the mixed color-resist area comprises two or more color-resist film layers arranged in layers with different colors.

In one aspect of the present disclosure, the mixed color-resist area comprises a first color-resist film layer and a second color-resist film layer. The first color-resist film layer and the second color-resist film layer are arranged in layers with different colors. The first color-resist film layer and the second color-resist film layer have the same color with one of the two correspondingly neighboring color-resist units.

According to still another embodiment of the present disclosure, a liquid crystal display (LCD) is provided. The LCD includes an array substrate as provided above, a cell-aligning substrate, and a liquid crystal layer, sandwiched between the array substrate and the cell-aligning substrate.

In one aspect of the present disclosure, the cell-aligning substrate comprises a second substrate and a black matrix arranged on the second substrate; the black matrix and the mixed color-resist area are arranged opposite; the width of the mixed color-resist area is equal to the width of the black matrix.

An array substrate including a color filter layer and a method of producing the array substrate are proposed by the present disclosure. A mixed color-resist area is arranged between any two neighboring color-resist units in the color filter layer. The mixed color-resist area includes two or more color-resist film layers arranged in layers with different colors. The arrangement of the present disclosure can prevent the light from leaking from neighboring pixels so a color shift because of a viewing angle caused by a light leak from the neighboring pixels can be effectively improved so as to enhance the display quality of the LCD.

DETAILED DESCRIPTION OF THE EMBODIMENTS

Figure 1:
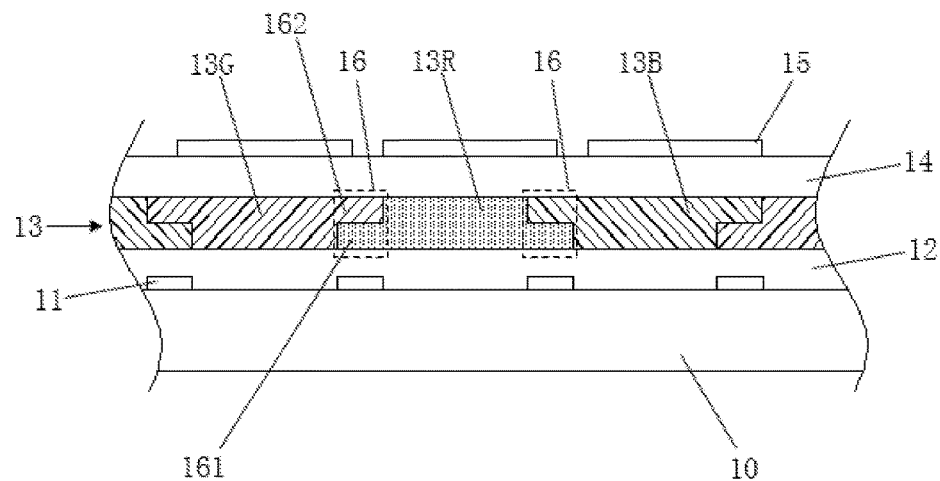
FIG. 1 illustrates a schematic diagram of an array substrate including a color filter layer according to a preferred embodiment of the present disclosure.

The invention is described below in detail with reference to the accompanying drawings, wherein like reference numerals are used to identify like elements illustrated in one or more of the figures thereof, and in which exemplary embodiments of the invention are shown. This invention may, however, be embodied in many different forms and should not be construed as limited to the particular embodiments set forth herein. Rather, these embodiments are provided so that this disclosure will be thorough and complete, and will fully convey the scope of the invention to those skilled in the art.

In addition, in order to clarify the present disclosure, only related components and/or steps are illustrated in the accompanying drawings. Other irrelevant components or steps are omitted.

An array substrate including a color filter layer is proposed by one embodiment of the present disclosure. As FIG. 1 illustrates, the array substrate includes a first substrate 10, a thin film transistor (TFT) 11 array, a first passivation layer 12, a color filter layer 13, a second passivation layer 14, and a pixel electrode 15. The TFT 11 array is arranged on a positive side of the first substrate 10 and covered by the first passivation layer 12. The color filter layer 13 is arranged on the first passivation layer 12 and covered by the second passivation layer 14. The pixel electrode 15 is arranged on the second passivation layer 14.

The TFT array indicates a plurality of TFTs 11 arranged in an array. Each subpixel corresponds to one of the plurality of TFTs 11. Each of the TFTs 11 further includes a gate, a gate insulating layer, an active layer, a source, and a drain (not illustrated in the figure). These components are concrete in the structure. The color filter layer 13 includes color-resist units with different colors and usually includes a red color-resist unit 13R, a green color-resist unit 13G, and a blue color-resist unit 13B. Each of the color-resist units corresponds to one of the subpixels. Each of the subpixels and one of the pixel electrodes 15 are arranged correspondingly. The pixel electrode 15 is connected to the drain of the TFT 11 corresponding to the subpixel through a hole (not illustrated in the figure). The hole is arranged in each of the layers.

Further, a mixed color-resist area 16 is arranged between two of the neighboring color-resist units 13R, 13G, 13B arbitrarily in the present embodiment. The mixed color-resist area 16 includes two color-resist film layers with different colors. The color-resist film layers are overlapped and arranged on the mixed color-resist area 16. The color-resist film layers are defined as first color-resist film layer 161 and second color-resist film layer 162.

Because the first color-resist film layer 161 and the second color-resist film layer 162 are arranged on the mixed color-resist area 16, light leaked from one of the subpixels toward the neighboring subpixels is blocked. After being filtered by the first color-resist film layer 161, the light penetrates the first color-resist film layer 161 and is blocked by the second color-resist film layer 162 with different color-resist colors. Therefore, the light cannot emit from the neighboring subpixels, which successfully prevents the light from leaking from the neighboring subpixels. Since the light fails to leak from the neighboring subpixels, a person having ordinary skill in the art understands that the mixed color-resist area 16 may include multiple color-resist film layers arranged in layers. As long as the color-resist film layers include color-resist film layers with different colors, the problem of the light leak from the neighboring subpixels can be solved with the above-mentioned method.

The mixed color-resist area 16 is correspondingly arranged on a non-display area in each of the subpixels. For example, the mixed color-resist area 16 covers on the TFT 11 correspondingly, which prevents the light from leaking without narrowing the aperture ratio of the pixel.

The first color-resist film layer 161 and the second color-resist film layer 162 can be color resists with arbitrary colors but the basic requirement is that the first color-resist film layer 161 and the second color-resist film layer 162 are different in color. In another embodiment, the choice of color for a first color-resist film layer 161 and a second color-resist film layer 162 can be two of red, green, and blue arbitrarily. The chosen colors can be more compatible with the producing process, which facilitates lower the cost.

Furthermore, an upper surface of the mixed color-resist area 16 is flush with an upper surface of the neighboring color-resist units 13R, 13G, and 13B. Further, the thickness of the color-resist film layers with different colors is the same; that is, the thickness of the first color-resist film layer 161 is the same as the thickness of the second color-resist film layer 162. These designs of the structure facilitate the producing technique for the color filter layer 13, which helps lower the cost.

In addition, the color of the first color-resist film layer 161 and the color of the second color-resist film layer 162 are identical to one of the two neighboring color-resist units correspondingly. The first color-resist film layer 161 and the one of the two correspondingly neighboring color-resist units form integrity, and the second color-resist film layer 162 and the other color-resist unit form integrity. Take the mixed color-resist area 16 between the red color-resist unit 13R and the green color-resist unit 13G for example, as FIG. 1 illustrates. At this time, the first color-resist film layer 161 is made from red color-resist material, and the second color-resist film layer 162 is made from green color-resist material. The first color-resist film layer 161 and the red color-resist unit 13R form integrity, and the second color-resist film layer 162 and the green color-resist unit 13G form integrity. The integral structure formed by the color-resist film layers and the neighboring color-resist units in the mixed color-resist area 16 can be more compatible with the producing process, which helps lower the cost.

Further, a method of producing the array substrate including the color filter layer as mentioned above is proposed by the present embodiment. The method includes block S1, block S2, block S3, block S4, block S5, and block S6.

At block S1, a first substrate 10 is provided and a thin film transistor (TFT) 11 array is produced and formed on the first substrate 10.

At block S2, a first passivation layer 12 is produced and formed on the TFT 11 array and covers the TFT 11 array completely.

At block S3, color-resist units 13R, 13G, and 13B with different colors are produced and formed on the first passivation layer 12 successively to form a color filter layer 13. A mixed color-resist area 16 is arranged between two of the neighboring color-resist units 13R, 13G, and 13B arbitrarily. The mixed color-resist area 16 includes two or more color-resist film layers with different colors. The color-resist film layers are arranged in layers.

At block S4, a second passivation layer 14 is produced and formed on the color filter layer 13 and covers a color filter layer 13 array completely.

At block S5, a hole is formed through the second passivation layer 14 to a TFT 11 with a photolithographic technique.

At block S6, a pixel electrode 15 is produced and formed on the second passivation layer 14. The pixel electrode 15 is electrically connected to the TFT 11 through the hole. The pixel electrode 15 is usually made from indium tin oxide (ITO).

The mixed color-resist area 16 includes the first color-resist film layer 161 and the second color-resist film layer 162 with different colors in the present embodiment. The first color-resist film layer 161 and the second color-resist film layer 162 are arranged in layers. The first color-resist film layer 161 and one of the two correspondingly neighboring color-resist units are produced at the same time and form integrity. The second color-resist film layer 162 and the other correspondingly neighboring color-resist are produced at the same time and form integrity.

Figure 2:
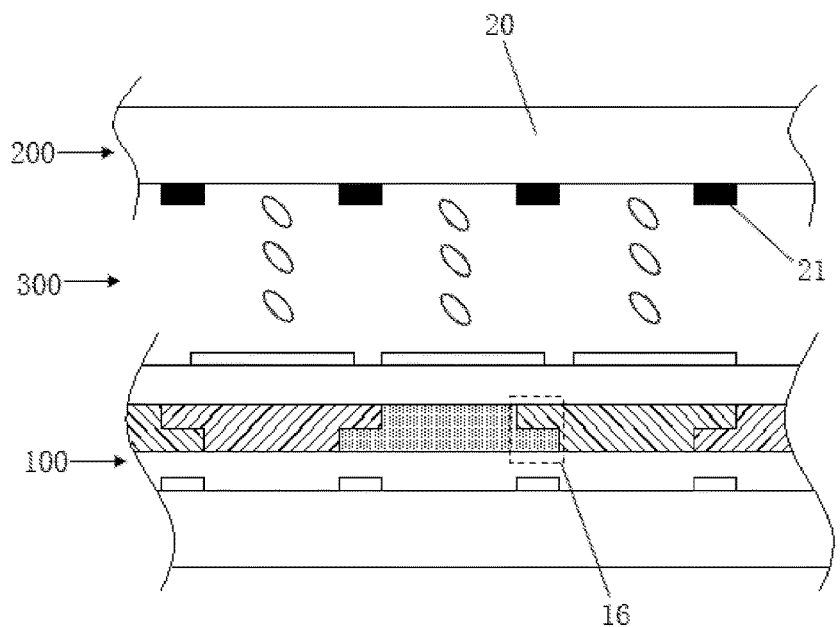
FIG. 2 illustrates a schematic diagram of a liquid crystal display according to a preferred embodiment of the present disclosure.

Further, a liquid crystal display is proposed by the present disclosure. As FIG. 2 illustrates, the liquid crystal display includes an array substrate 100, a cell-aligning substrate 200, and a liquid crystal layer 300. The array substrates 100 and the cell-aligning substrate 200 are arranged opposite. The liquid crystal layer 300 is arranged between the array substrates 100 and the cell-aligning substrate 200. The array substrate 100 adopts the array substrate including the color filter layer 13 as mentioned above.

Further, as FIG. 2 illustrates, the cell-aligning substrate 200 includes a second substrate 20 and a black matrix 21 arranged on the second substrate 20 in the present embodiment. The black matrix 21 and the mixed color-resist area 16 in the array substrate 100 are arranged opposite. The width of the mixed color-resist area 16 is equal to the width of the black matrix 21.

Consequently, an array substrate including a color filter layer and a method of producing the array substrate are proposed by the present disclosure. A mixed color-resist area is arranged between any two neighboring color-resist units in the color filter layer. The mixed color-resist area includes two or more color-resist film layers arranged in layers with different colors. The arrangement of the present disclosure can prevent the light from leaking from neighboring pixels so a color shift because of a viewing angle caused by a light leak from the neighboring pixels can be effectively improved so as to enhance the display quality of the LCD.

The terminology used herein is for the purpose of describing particular embodiments only and is not intended to be limiting of the invention. As used herein, the singular forms "a", "said" and "the" are intended to include the plural forms as well, unless the context clearly indicates otherwise. It will be understood that the term "and/or," when used in this specification, specify one or more associated elements, alone or in combination, are provided. It will be further understood that the terms "first," and "second," when used in this specification, claim and drawings, are used to distinguish different objects, rather than to describe a specific order. It will be further understood that the terms "comprises" and/or "comprising," when used in this specification, specify the presence of stated features, products, steps, operations, elements, and/or components, but do not preclude the presence or addition of one or more other features, products, steps, operations, elements, components, and/or groups thereof.

Above are embodiments of the present invention, which does not limit the scope of the present invention. Any modifications, equivalent replacements or improvements within the spirit and principles of the embodiment described above should be covered by the protected scope of the invention.

What is claimed is:

1. An array substrate comprising a color filter layer, comprising:
    a black matrix;
    a first substrate; and
    a thin film transistor (TFT) array, arranged on the first substrate;
    a color filter layer, arranged on the TFT array and comprising color-resist units with different colors, wherein a mixed color-resist area is arranged between the two neighboring color-resist units; the mixed color-resist area comprises two or more color-resist film layers arranged in layers with different colors;
    wherein an upper surface of the mixed color-resist area is flush with an upper surface of one of the neighboring color-resist units and a lower surface of the mixed color-resist area is flush with a lower surface of the other one of the neighboring color-resist units;
    wherein a width of the black matrix is equal to a width of the mixed color-resist area.

2. The array substrate of claim 1, wherein the color filter layer comprises a red color-resist unit, a green color-resist unit, and a blue color-resist unit; the two or more color-resist film layers are red, green, or blue.

3. The array substrate of claim 1, wherein thickness of the color-resist film layers with the different colors is the same in the mixed color-resist area.

4. The array substrate of claim 1, wherein the mixed color-resist area comprises a first color-resist film layer and a second color-resist film layer; the first color-resist film layer and the second color-resist film layer are arranged in layers with different colors; the first color-resist film layer and the second color-resist film layer have the same color with one of the two correspondingly neighboring color-resist units.

5. The array substrate of claim 4, wherein the first color-resist film layer and one of the two correspondingly neighboring color-resist units are formed integrally; the second color-resist film layer and the other correspondingly neighboring color-resist unit are formed integrally.

6. A method of producing an array substrate having a color filter layer, comprising:
    Forming a black matrix;
    forming a thin film transistor (TFT) array and a color filter layer arranged on a first substrate successively, wherein forming the color filter layer comprises:
    producing and forming color-resist units with different colors on the TFT array successively;
    arranging a mixed color-resist area between the two neighboring color-resist units wherein the mixed color-resist area comprises two or more color-resist film layers arranged in layers with different colors wherein an upper surface of the mixed color-resist area is flush with an upper surface of one of the neighboring color-resist units and a lower surface of the mixed color-resist area is flush with a lower surface of the other one of the neighboring color-resist units;
    wherein a width of the black matrix is equal to a width of the mixed color-resist area.

7. The method of claim 6, wherein the mixed color-resist area comprises a first color-resist film layer and a second color-resist film layer; the first color-resist film layer and the second color-resist film layer are arranged in layers with different colors; the first color-resist film layer and the second color-resist film layer have the same color with one of the two correspondingly neighboring color-resist units.

8. The method of claim 7, wherein the first color-resist film layer and one of the two correspondingly neighboring color-resist units are formed integrally; the second color-resist film layer and the other correspondingly neighboring color-resist unit are formed integrally.

9. The method of claim 6, wherein the color filter layer comprises a red color-resist unit, a green color-resist unit, and a blue color-resist unit; the two or more color-resist film layers are red, green, or blue.

10. The method of claim 6, wherein thickness of the color-resist film layers with the different colors is the same in the mixed color-resist area.

11. A liquid crystal display (LCD), comprising:
    an array substrate, comprising:
        a first substrate; and
        a thin film transistor (TFT) array, arranged on the first substrate; and
    a color filter layer, arranged on the TFT array and comprising color-resist units with different colors, wherein a mixed color-resist area is arranged between the two neighboring color-resist units; the mixed color-resist area comprises two or more color-resist film layers arranged in layers with different colors wherein an upper surface of the mixed color-resist area is flush with an upper surface of one of the neighboring color-resist units and a lower surface of the mixed color-resist area is flush with a lower surface of the other one of the neighboring color-resist units;
    a cell-aligning substrate; and
    a liquid crystal layer, sandwiched between the array substrate and the cell-aligning substrate;
    wherein the cell-aligning substrate comprises a second substrate and a black matrix arranged on the second substrate; the black matrix and the mixed color-resist area are arranged opposite, a width of the mixed color-resist area is equal to a width of the black matrix.

12. The LCD of claim 11, wherein the color filter layer comprises a red color-resist unit, a green color-resist unit, and a blue color-resist unit; the two or more color-resist film layers are red, green, or blue.

13. The LCD of claim 11, wherein thickness of the color-resist film layers with the different colors is the same in the mixed color-resist area.

14. The LCD of claim 11, wherein the mixed color-resist area comprises a first color-resist film layer and a second color-resist film layer; the first color-resist film layer and the second color-resist film layer are arranged in layers with different colors; the first color-resist film layer and the second color-resist film layer have the same color with one of the two correspondingly neighboring color-resist units.

15. The LCD of claim 14, wherein the first color-resist film layer and one of the two correspondingly neighboring color-resist units are formed integrally; the second color-resist film layer and the other correspondingly neighboring color-resist unit are formed integrally.

* * * * *